United States Patent
Rommerskirchen et al.

(10) Patent No.: US 12,043,796 B2
(45) Date of Patent: Jul. 23, 2024

(54) INJECTION FLUIDS COMPRISING ALKOXYLATED ALCOHOLS AND THE USE OF SUCH FLUIDS IN OIL RECOVERY PROCESSES

(71) Applicant: Sasol Chemicals GmbH, Hamburg (DE)

(72) Inventors: Renke Rommerskirchen, Nottuln (DE); Thomas Sottmann, Stuttgart (DE); Harun Bilgili, Stuttgart (DE); Julian Fischer, Stuttgart (DE)

(73) Assignee: Sasol Chemie GmbH & Co KG, Hamburg (DE)

( * ) Notice: Subject to any disclaimer, the term of this patent is extended or adjusted under 35 U.S.C. 154(b) by 0 days.

(21) Appl. No.: 17/431,882

(22) PCT Filed: Feb. 18, 2020

(86) PCT No.: PCT/EP2020/054261
§ 371 (c)(1),
(2) Date: Aug. 18, 2021

(87) PCT Pub. No.: WO2020/169618
PCT Pub. Date: Aug. 27, 2020

(65) Prior Publication Data
US 2022/0186106 A1    Jun. 16, 2022

(30) Foreign Application Priority Data
Feb. 19, 2019 (EP) .................................... 19158014

(51) Int. Cl.
*C09K 8/594* (2006.01)

(52) U.S. Cl.
CPC .................................. *C09K 8/594* (2013.01)

(58) Field of Classification Search
CPC ........... C09K 8/594; C09K 8/58; E21B 43/16; E21B 43/164
See application file for complete search history.

(56) References Cited

U.S. PATENT DOCUMENTS

| 3,278,457 A | 10/1966 | Milgrom |
| 4,799,547 A | 1/1989 | Borchardt |

(Continued)

FOREIGN PATENT DOCUMENTS

| CN | 104610953 | 5/2015 |
| CN | 104610953 A * | 5/2015 |

(Continued)

OTHER PUBLICATIONS

Translation CN 104610953 A (Year: 2015).*
(Continued)

*Primary Examiner* — Angela M DiTrani Leff
(74) *Attorney, Agent, or Firm* — Werner IP Law, P.C.

(57) ABSTRACT

The present invention is concerned with an injection fluid comprising liquid or super-critical carbon dioxide ($CO_2$) and alkoxylated alcohols and the use of such fluids in oil recovery processes. More specifically, the invention it relates to the reduction of the miscibility pressure during $CO_2$ injection oil recovery processes by the use of alkoxylated alcohols. Further, the invention relates to an oil recovery process injecting $CO_2$ and alkoxylated alcohols.

18 Claims, 2 Drawing Sheets

(56) References Cited

U.S. PATENT DOCUMENTS

Figure 1:
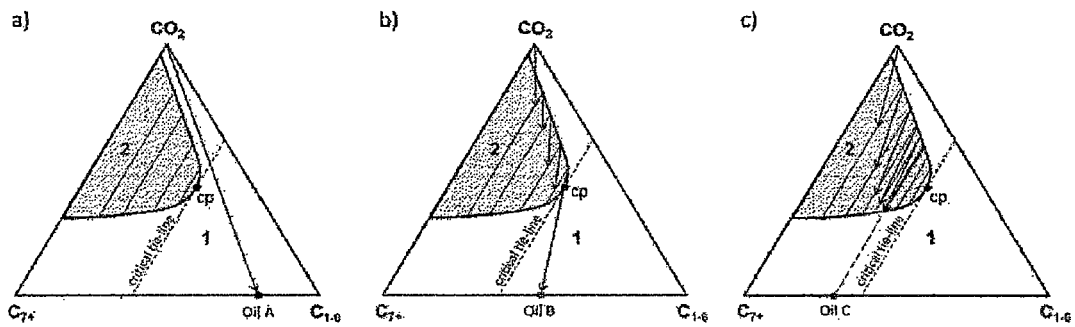

| | | | |
|---|---|---|---|
| 4,899,817 A | | 2/1990 | Djabbarah |
| 5,033,547 A | * | 7/1991 | Schievelbein ......... C09K 8/594<br>507/261 |
| 2011/0198101 A1 | * | 8/2011 | Sanders ................ C09K 8/584<br>166/402 |

FOREIGN PATENT DOCUMENTS

| | | | | |
|---|---|---|---|---|
| CN | 107178345 | | 9/2017 | |
| DE | 102012019822 A1 | * | 4/2014 | ......... E21B 41/0064 |
| WO | 2010/044818 | | 4/2010 | |
| WO | 2013/048860 | | 4/2013 | |
| WO | WO-2015135851 A1 | * | 9/2015 | ............ C09K 8/584 |
| WO | WO-2019195606 A1 | * | 10/2019 | ............... C09K 8/26 |
| WO | WO-2020172087 A1 | * | 8/2020 | ............ C09K 8/584 |

OTHER PUBLICATIONS

Translation DE-102012019822-A1 (Year: 2014).*

Voon, et al.; "Reduction of MMP Using Oleophilic Chemicals" Intl J. of Chem and Mol. Eng., vol. 8, No. 4, 2014, p. 351-353.

Wang; "Determination of Miscibility Pressure—Direct Observation Method" Jan. 1984, Work performed for Dept En., Contract No. DE-AC21-81MC 16140.

Hagen, et al.; "Determination of Minimum Miscibility Pressure Using a High-Pressure Visual Sapphire Cell", 1986, SPE/DOE 14927.

Santacesaria, et al.; "Kinetics and Mechanisms of Fatty Alcohol Polyethoxylation. 1. The Reaction Catalyzed by Potassium Hydroxide." Ind. Eng. Chem. Res. 1992 31(11), 2413-2418.

Ionescu: "Chemistry and Technology of Polyols for Polyurethanes" Smithers Rapra Publishing, 2005, 2nd Ed., vol. 1, p. 177-196, Chapter 5: "Synthesis of High-Molecular Weight Polyether Polyols with Double Metal Cyanide Catalysts.".

* cited by examiner

Pressure increase

INJECTION FLUIDS COMPRISING ALKOXYLATED ALCOHOLS AND THE USE OF SUCH FLUIDS IN OIL RECOVERY PROCESSES

The present invention relates to injection fluids comprising liquid or supercritical carbon dioxide ($CO_2$) and alkoxylated alcohols and the use of such fluids in oil recovery processes. More specifically, the invention relates to the reduction of the miscibility pressure during $CO_2$ injection oil recovery processes by the use of alkoxylated alcohols. Further the invention relates to an oil recovery process injecting $CO_2$ and alkoxylated alcohols.

BACKGROUND OF THE INVENTION AND DISCUSSION OF THE PRIOR ART

Flooding with $CO_2$ aims for two major effects—first to swell the crude oil and second to lower its viscosity. Thereby an increased mobility is achieved and the formation is swept more efficiently. For a successful flood the interaction between crude oil and injection fluid is the determining factor. In order to manoeuvre the crude oil through the rock pores it has to mix with the injected $CO_2$. The differences in the miscibility behaviour define the flooding scheme that occurs at defined reservoir conditions. It is strongly connected to the crude oil composition. Lighter parts of the crude oil vaporize into the $CO_2$ phase and an equilibrated $CO_2$-rich phase is generated. At the same time heavier parts from the crude oil are extracted by the $CO_2$ condensing into the crude oil, forming a transition zone. The miscibility behaviour can be visualized using a ternary phase diagram at constant temperature and pressure.

FIG. 1a illustrates the first contact miscibility (FCM). The crude oil composition denoted with "Oil A" lays closer to the side of the lighter components (C1-6). A fully mixed single phase (1) is present for each composition of the mixture of "Oil A" and $CO_2$. The injection pathway starting from pure $CO_2$ bypasses the miscibility gap (grey area 2), that defines the range of compositions of the mixture that will separate into two phases, the $CO_2$ rich vaporizing phase and the oil rich condensing extraction phase.

In FIG. 1b the injection pathway from pure $CO_2$ to the oil composition "Oil B" crosses the miscibility gap. Thus, separation processes occur that generate the transition zone as described above.

Each separation process creates a new equilibrated $CO_2$ rich injection phase and a new oil rich extraction phase whose compositions converge until complete miscibility is achieved. Such a multiple contact miscible (MCM) flood is possible for crude oils with an injection path crossing the miscibility gap but still having a hydrocarbon composition on the right-hand side (closer to C1-6) of the critical tie line, that is defined by the critical point (cp) of the miscibility gap.

In FIG. 1c, the crude oil denoted as "Oil C" contains a high ratio of heavier components (C7+). Its composition is located on the left-hand side of the critical tie line. Therefore, the injection pathway starting from the pure $CO_2$ will always cross the miscibility gap for each newly developed $CO_2$ rich phase and separation occurs for every point of the injection pathway. The result is an immiscible procedure in which only the hydrocarbons of the formed transition zone are recoverable while the heavier parts of the crude oil that are not extracted by the $CO_2$ and remain in the formation. Full miscibility will not be achieved.

Figure 2:
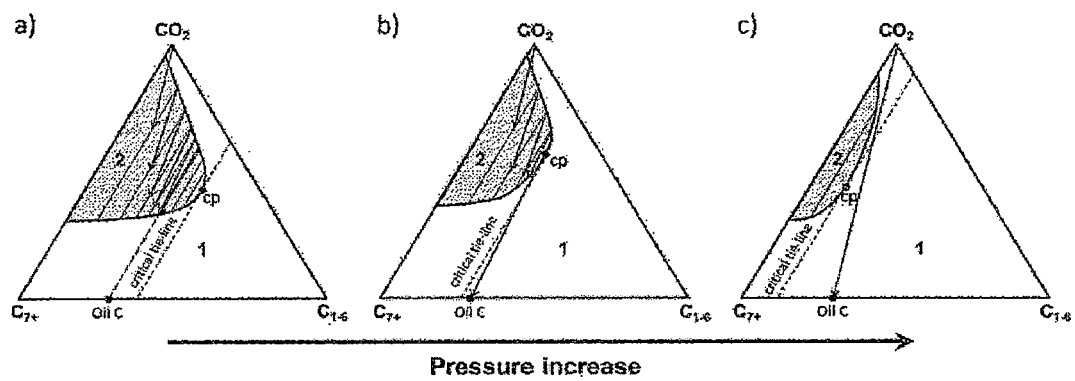

Beside the crude oil composition, the pressure plays a role for the miscibility behaviour. With increasing pressure the extent of the miscibility gap shrinks. Thereby the critical point (cp), and with it the critical tie line, moves towards the $CO_2$/C7+ side of the phase triangle. This is schematically shown in FIG. 2. The former immiscible procedure (FIG. 2a) is converted into an MCM type flood once the critical tie line passes the composition "Oil C" (FIG. 2b). A further pressure increase results in a miscibility gap that is small enough to not affect the injection pathway anymore and the process becomes of the type FCM (FIG. 2c).

Figure 3:
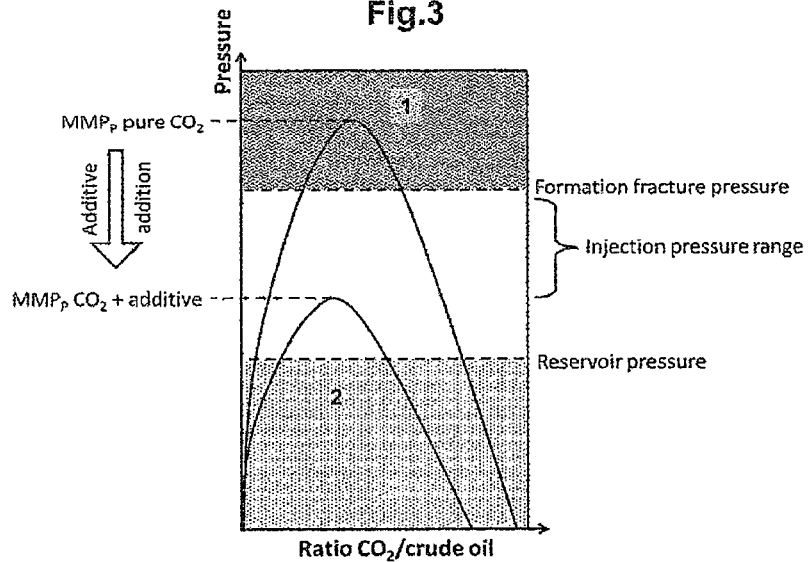

Considering the above it is evident that the efficiency and the economics of $CO_2$ floods are strongly connected to the pressure that needs to be applied when injecting the carbon dioxide. The minimum miscibility pressure (MMP) defines the minimum pressure that has to be applied to inject the carbon dioxide fluid for achieving a miscible MCM procedure. For the more efficient FCM floods the injection pressure has to be above the physical minimum miscibility pressure ($MMP_P$). On the other hand, the formation fracturing pressure caps the injection pressure. Thus, the $MMP_P$ has to be below the formation fracturing pressure to allow the implementation of a fully miscible FCM flood at any ratio of $CO_2$ and crude oil. As a consequence, lowering the miscibility pressure can make $CO_2$ injection enhanced oil recovery (EOR) applicable for reservoirs that were found to be immiscible before. A schematic view of the modified miscibility behaviour of a $CO_2$/crude oil system is shown in FIG. 3.

Improving the miscibility of $CO_2$ and crude oil has more than one beneficial effect. The $CO_2$ utilization is enhanced what comes with higher oil recovery rates for the same amount of carbon dioxide injected. Furthermore, the most economically favourable process would be if the $MMP_P$ is found to be below the reservoir pressure itself. Additionally, with increasing injection pressure the operational costs also rise. Thus, a lower $MMP_P$ will also deliver more economic results for reservoirs that are already miscible or near-miscible.

Another important factor for the recovery of crude oil using $CO_2$ is the swelling behaviour of the residual oil trapped in the formation. Already at low pressures the $CO_2$ condenses into the liquid oil phase leading to a swelling of the oil phase. Due to its increased volume the swollen oil phase is then squeezed out of the tight rock pores of the formation rock where it had been trapped. At the same time the viscosity of the oil is decreased which allows a better flow through the reservoir even at zones of low permeability. Swelling of the oil starts already near the critical pressure of $CO_2$ and below the MMP. With increasing pressure the extraction process starts to dominate. This is caused by vaporizing of crude oil components in the super critical $CO_2$ ($scCO_2$) which then are being produced. More and more of the crude oil migrates in the $scCO_2$ phase until at the $MMP_P$ full miscibility is achieved and only one homogeneous phase exists. Swelling and extraction are easy to measure visually by recording the volume of the excess oil phase. The swelling factor (SF) describes the efficiency of the swelling effect for a given system, i.e. involving an identical composition at one constant temperature. It is calculated as the ratio of the volume of the oil phase at the pressure at which it is maximally swollen ($V_{oil}$) and the initial volume of the oil phase at ambient pressure ($V^0_{oil}$):

$$SF = V_{oil}/V^0_{oil}$$

The creation of so-called $CO_2$-foams in reservoirs, which are understood to be $CO_2$-in-water dispersions (where the internal $CO_2$ phase can be in gaseous, liquid, or supercritical state), were previously applied to improve the oil recovery.

The use of surfactants, specifically optimized to create foams, provides a $CO_2$ injection fluid with higher viscosity and thereby allow for better mobility control. According to WO 2010/044818 A1 $CO_2$-foams assist to divert the injected $CO_2$ into unflooded areas in the formation which were by-passed before, due to the density difference of the crude oil and the $CO_2$ and their different viscosities. Usually, these foams are used in injection processes where the $CO_2$ is miscible even without surfactants added. In this type of applications, the choice of the nonionic surfactant is optimized specifically to form $CO_2$ foams by adding water, as described in WO 2013/048860 A1. The purpose of the nonionic surfactants is to create $CO_2$-foams (and not to improve the miscibility between the $CO_2$ and the crude oil, which are already miscible).

The alkoxylated alcohols of the present invention were not chosen to create $CO_2$ foams, but to be used in reservoirs that are operated at pressures below the MMP. These type of conditions lead to crude oils being mostly immiscible with $CO_2$. In the past, $CO_2$ FOR applications were considered to be uneconomical for these type of scenarios and were not implemented in most cases. The present invention aims to make those reservoirs applicable for $CO_2$ EOR, specifically by lowering the MMP through the choice of the claimed additives from the class of alkoxylated alcohols, thereby bringing the pressure-dependent miscibility behaviour (cp. FIG. 3) into a range at which successful operation in miscible conditions, FCM or MCM, can be achieved.

Consequently, the miscibility pressures are lowered, leading to higher swelling factors of the hydrocabonaceous fluid (crude oil) by the injection fluid, and subsequent higher recovery rates of the crude oil from the reservoir.

It was reported earlier in a patent by Mobil Oil (U.S. Pat. No. 4,899,817) that adding C1-C8 alcohols can lower miscibility pressures. In another study by C. L. Voon and M. Awang: "Reduction of MMP Using Oleophilic Chemicals" (International Journal of Chemical and Molecular Engineering, Vol: 8, No: 4, 2014, p. 351-353) the influence of different alcohols obtained from SASOL on the miscibility pressure was investigated. The study comprised ALFOL 1214, ISOFOL 12, ISOFOL 16, and ISOFOL 28, LIAL 123, LIAL 167, and MARLIPAL O13. The authors, however, did not observe a significant trend.

The application of alkoxylates for lowering miscibility pressures is also described in a Chinese patent application CN104610953 A. The authors claim a significant miscibility pressure reduction by adding linear C10-C18 alkoxylated alcohols and its analogue alkylphenol derivatives to $CO_2$. According to this reference however, a co-solvent (typically C1-C5 carbon chain alcohols) is mandatory.

OBJECT OF THE PRESENT INVENTION

It is the object of this invention to enhance the miscibility of $CO_2$ and crude oils leading to a reduced miscibility pressure and a lower crude oil viscosity, during $CO_2$ injection oil recovery processes.

It is another object of this invention to improve the swelling behaviour of crude oils, specifically to increase the swelling of crude oils during $CO_2$ injection oil recovery processes.

SUMMARY OF THE INVENTION

In the following, the injection fluid according to the invention that can be utilized in the recovery of hydrocarbonaceous fluids from a reservoir is described. These fluids have been found to be very effective in swelling the crude oil and subsequently lowering the miscibility pressure even at high reservoir temperatures. This results in increased mobility of the crude oil and efficient sweeping of the rock formation.

The injection fluid according to the invention providing an improved miscibility pressure, an improved swelling factor or both comprises liquid or supercritical $CO_2$ and at least one alkoxylated alcohol, with a molecular structure as shown in structure I $$R\text{—}O\text{-}(AO)_{m+n}\text{—}H \qquad (I)$$

wherein
R is a linear alkyl group having from C4 to C9 carbon atoms and/or a branched alkyl group having from C4 to C18 carbon atoms;
AO is an ethoxy group (EO) and/or propoxy group (PO), wherein m and n may be the same or different and AO can be different for each m or n, wherein the EO and PO may for example
be randomly distributed or
be one or more blocks of multiple EO bound to one or more blocks of multiple PO;
m=0 to 12;
n=0 to 12;
m+n≥1.

and wherein the improved miscibility pressure, the improved swelling factor or both are further defined as follows:
the miscibility pressure between the injection fluid and a hydrocarbonaceous fluid is lowered compared to the miscibility pressure between the hydrocarbonaceous fluid and carbon dioxide only, preferably by at least 4.9%, more preferably by at least 8.2%, and most preferably by at least 16.3%;
the swelling factor of a hydrocarbonaceous fluid is increased by the injection fluid compared to the swelling factor between the hydrocarbonaceous fluid and carbon dioxide only, preferably by at least 4%.

Preferred are block structures as shown in structure II $$R\text{—}O\text{-}(A'O)_m\text{-}(A''O)_n\text{—}H \qquad (II)$$

wherein
A'O is an ethoxy group (EO) and A"O is a propoxy group (PO); or
A'O is a propoxy group (PO) and A"O is an ethoxy group (EO);
with R, m, n and m+n having the same meaning as described above.

If one block of EO and one block of PO is present, $\text{-}(AO)_{m+n}\text{—}$ of structure (I) may be described by $\text{-}(A'O)_m\text{-}(A''O)_n\text{—}$. Depending whether the EO block or the PO block is first, Structure (II) may be described by structures (IIa) and (IIb):

$$R\text{—}O\text{-}(EO)_m\text{-}(PO)_n\text{—}H \qquad (IIa)$$

or $$R\text{—}O\text{-}(PO)_m\text{-}(EO)_n\text{—}H \qquad (IIb)$$

The injection fluids may comprise mixtures of alkoxylated alcohols of structures (I) or (II) or mixtures of alkoxylated alcohols of structures (IIa) or (IIb).

According to one embodiment R is a linear C4 to C9 alkyl group, preferably a linear C4 to C8 alkyl group.

According to a further embodiment R is a branched alkyl group having 4 to 18 carbon atoms, in particular a branched alkyl group having 8 to 14 carbon atoms. The branching may be at the 2 position (2-alkyl branched R groups).

The alkoxylated alcohol may comprise only EO groups (according to one embodiment n=0 for structure (IIa)) or only PO groups (according to one embodiment m=0 for structure (IIa)). In alkoxylates incorporating both EO and PO blocks, the PO block is preferably in a terminal position (see structure (IIa)).

The degree of alkoxylation (m+n) is preferably 1 to 8, in particular 2 to 6.

The amount of the above alkoxylated alcohol in the injection fluid is preferably in the range of 0.1 to 10.0% by weight, preferably 0.1 to 2.0% by weight, each relative to the weight of the carbon dioxide.

The method according to the invention involves injecting the fluid into an oil well thereby flooding the oil well by $CO_2$ comprising as an additive at least the above defined alkoxylated alcohols.

Also claimed is the use of the alkoxylated alcohols as defined above in an injection liquid comprising liquid or supercritcal carbon dioxide, the injection liquid being utilized in the recovery of a hydrocarbonaceous fluid from a reservoir. The hydrocarbonaceous fluid preferably is a crude oil and the reservoir preferably is an oil well.

The alkoxylated alcohols together with the $CO_2$ preferably increase the swelling factor of the hydrocarbonaceous fluids by at least 4% upon addition of the alkoxylated alcohols when compared to the swelling factor without the addition of the alkoxylated alcohols. The hydrocarbonaceous fluid preferably is a crude oil and the reservoir preferably is an oil well.

The injection fluid according to one embodiment may further comprise a linear C4 to C9 alcohol, preferably a linear C4 to C8 alcohol. According to a further embodiment the injection fluid comprises a branched alcohol having 4 to 18 carbon atoms, in particular a branched alcohol having 8 to 14 carbon atoms. The above alcohols may have a chain length and structure corresponding to the R group(s) of the alkoxylates contained in the injection fluid.

According to one embodiment of the invention the injection fluid consists of $CO_2$ and the alkoxylated alcohol and optionally the linear C4 to C9 alcohol and optionally the branched alcohol having 4 to 18 carbon atoms each as define above.

According to one embodiment of the invention the injection fluid as defined herein comprises less than 1 wt. % water and preferably does not comprise water.

DETAILED DESCRIPTION

Suitable alcohols that can be used to synthesize the above described alkoxylated alcohols include, but are not limited to linear alcohols such as butanol, linear C6 and C8 alcohols (such as NACOL 6 and NACOL 8), and branched alcohols such as 2-ethylhexanol, iso-nonanol, 2-alkyl-1-alkanols (Guerbet alcohols, such as ISOFOL 12, ISOFOL 16), and isotridecyl alcohols (such as MARLIPAL O13, a C13 oxoalcohol). All examples represented by trade names are marketed by Sasol Performance Chemicals. The alkoxylated alcohols are typically added to the $CO_2$ in percentages ranging from 0.1-10.0 wt %, preferably from 0.1-2.0 wt %. The above alcohols will then form group R in the of structure (I), (II), (IIa) or (IIb) defined above.

The invention is further explained with reference to the figures:

FIG. 1: Schematic view of the phase triangles of $CO_2$ flooding processes at constant pressure and temperature. The crude oil composition can be expressed as a blend of heavier (C7+) and lighter components (C1-6). Depending on their ratio in the crude oil the flooding process is either
  a) first-contact miscible (FCM),
  b) multiple-contact miscible (MCM), or
  c) immiscible.

For a crude oil that contains a larger amount of light components the injection pathway leads to FCM (Oil A) or MCM (Oil B) processes. If the crude oil composition contains a higher ratio of heavier components the injection pathway will always cross the miscibility gap for each new $CO_2$-rich injection phase and separation occurs for every point of the injection pathway. Miscibility will never be reached (Oil C).

FIG. 2: Schematic view of the phase triangles when increasing the pressure at constant temperature. Starting at an immiscible process (a, compare also FIG. 1c) increasing the pressure leads to a smaller miscibility gap and an MCM type procedure when the critical tie-line passes the composition of Oil C (b). A further pressure increase transfers the process to FCM conditions (c).

FIG. 3: Schematic view of the miscibility gap of the system $CO_2$/crude oil illustrating the influence of additive addition on the miscibility gap and therewith the $MMP_P$.

Figure 4:
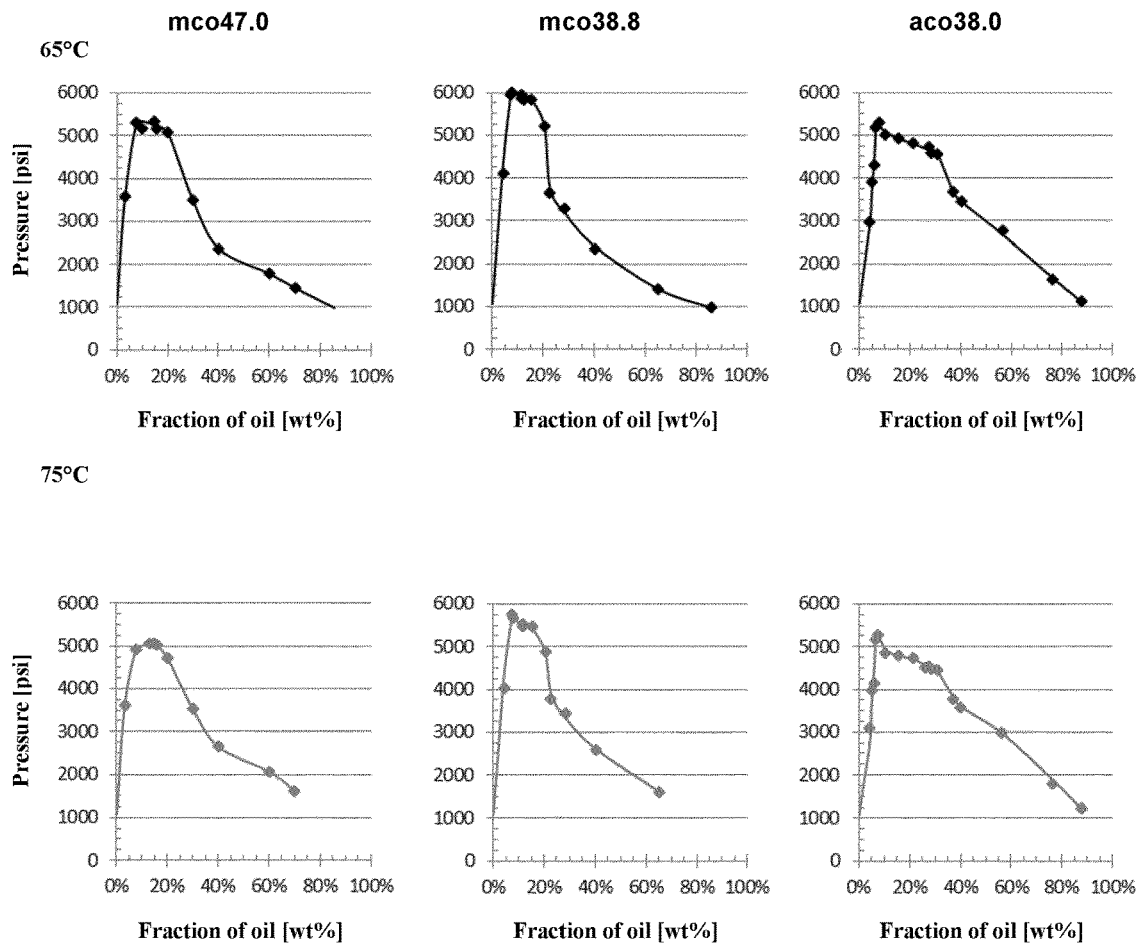

FIG. 4: Miscibility gaps of $CO_2$ and the three oils at 65° C. and 75° C.

Figure 5:
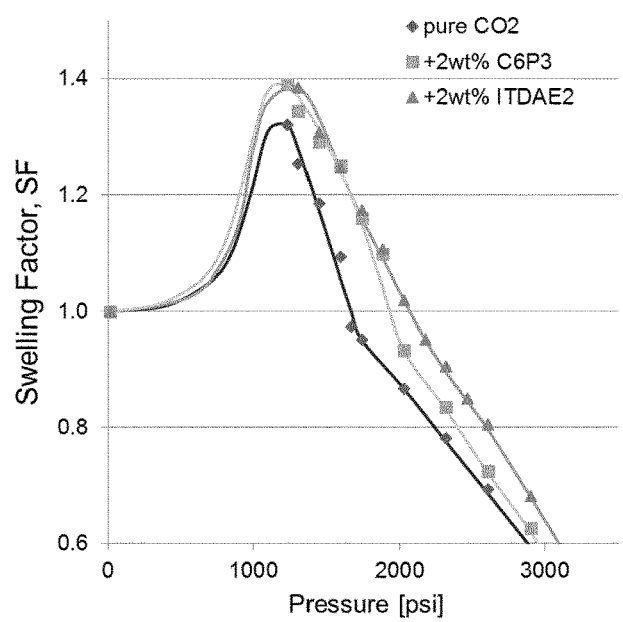

FIG. 5: Swelling factor at 65° C. at increasing pressure of the system aco38.0 for $CO_2$ without additive and in the presence of 2 wt % of C6P3 or 2 wt % of ITDAE2, respectively, in the $CO_2$.

EXPERIMENTAL SECTION

An easily accessible method was applied to demonstrate efficiency of fluids for reducing miscibility pressure at constant temperature. In contrast to the MMP, the physical minimum miscibility pressure ($MMP_P$) is the pressure at which crude oil and $CO_2$ are completely miscible at any ratio. A flood at those conditions is FCM as mentioned above. The $MMP_P$ can be determined using a visual pressure cell. Based on comparisons between $MMP_P$ and MMP that were done earlier, i.a. by G. C. Wang: "Determination of Miscibility Pressure—Direct Observation Method", 01/1984, Work performed for the Department of Energy under Contract No. DE-AC21-81MC 16140, US DOE, University Alabama, Tuscaloosa, Alabama and S. Hagen and C. A. Kossack: "Determination of Minimum Miscibility Pressure Using a High-Pressure Visual Sapphire Cell", 1986, SPE/DOE 14927, the authors assume that the same effects found for the $MMP_P$ are valid for the MMP as well and a reduction of the $MMP_P$ is a strong indication of a reduction of the MMP.

The experiments were performed using a pressure resistant visual observation cell equipped with a sapphire cylinder. The temperature was controlled using a water bath and the pressure adjusted via a piston. A sample of specific composition was loaded into the cell adding all components by weight and using a magnetic stir bar for homogenization. Afterwards the miscibility at various temperatures in a range of typical reservoir pressures was monitored. To ensure the presence of fully miscible conditions it was verified visually that a homogeneous mixture existed and no excess phases developed.

This procedure allows an easy screening of the pressure and temperature dependency of the miscibility for each sample. In this way the influence of the additives on the miscibility behaviour of $CO_2$ and oil was studied. Additionally, by recording the volumes of coexisting oil and $CO_2$ rich phases the swelling behaviour was determined.

Three oils were used to demonstrate the performance of the of the alkoxylated alcohols according to the invention to lower the miscibility pressure during the recovery of oils from a reservoir:

Two oils were synthetic model oils (mco47.0 and mco38.8), comprising paraffinic compounds, naphthenes, aromatic structures, and a wax compound. Additionally, a crude oil (aco38.0) was included to study the performance of the displacing fluids. The oils were characterized using their API gravity:

i) Synthetic model oil, mco47.0, with an of API=47.0°. It was a paraffinic oil containing approximately 41 wt % paraffins, 8 wt % aromatics, 21 wt % naphthenes, and 30 wt % wax.

ii) The second synthetic crude oil, mco38.8, with an API=38.8°. It was composed of 16 wt % paraffins, 34 wt % aromatics, 20 wt % naphthenes, and 30 wt % wax.

iii) The crude oil, aco38.0, was an Asian oil with an API=38.0°. From the analytical data available it was known that it contained almost no asphaltenes (only 0.03%) and 7.6% wax. The remaining is predominantly composed of saturated hydrocarbons. The compositions are illustrated in Table 1.

TABLE 1

Composition of the synthetic oils mco47.0 (more paraffinic) and mco38.8 (more aromatic) and aco38.0 (Asian crude).

| | mco47.0 | mco38.8 | aco38.0 |
|---|---|---|---|
| paraffins | 41 | 16 | |
| aromatics | 8 | 34 | 9 |
| naphtenes | 21 | 20 | |
| waxes | 30 | 30 | 7 |
| resins | | | 12 |
| saturates | | | 67 |
| asphaltenes | | | <0.05 |
| others | | | 6 |

All three oils exhibited extended miscibility gaps as can be seen in FIG. 4. With increasing the temperature from 65° C. to 75° C. the miscibility gap shifted to lower pressures on the $CO_2$-rich side, while it shifted to higher pressure on the oil-rich side. Its shape remained almost unchanged. The shape of the miscibility gaps of the synthetic model oils and the crude oil were quite similar, demonstrating that the synthetic oils accurately mimic crude oil. Since the composition with the highest pressure required for full miscibility (i.e. the $MMP_P$) was recorded on the $CO_2$-rich side of the mixture, the influence of the additives was studied at a ratio of 7.5 wt % oil in the mixture.

The miscibility pressures (provided as absolute pressures) for the oils with pure $CO_2$ at a ratio of 7.5 wt % oil, i.e. the maximum of the pseudo-binary miscibility gaps, are shown in Table 2:

TABLE 2

| Miscibility pressures | 65° C. [psi] | 65° C. [MPa] | 75° C. [psi] | 75° C. [MPa] |
|---|---|---|---|---|
| mco47.0 | 5294 | 36.5 | 4931 | 34.0 |
| mco38.8 | 5990 | 41.3 | 5685 | 39.2 |
| aco38.0 | 5294 | 36.5 | 5265 | 36.3 |

The fluid additives used herein are alkoxylated alcohols as listed in table 7. The alkoxylation was performed by reacting the alcohol of choice with at least one alkylene oxide in presence of a catalyst which can be, but is not limited to, a base (e.g. KOH) or a double metal cyanide (DMC) catalyst. Typical synthesis methods for base-catalyzed alkoxylations are for example described in E. Santacesaria, M. Di Serio, R. Garaffa and G. Addino: "Kinetics and mechanisms of fatty alcohol polyethoxylation. 1. The reaction catalyzed by potassium hydroxide"; Ind. Eng. Chem. Res. 1992, 31(11), 2413-2418. Alkoxylation methods using DMC catalysts are described in U.S. Pat. No. 3,278,457, as well as in Mihail Ionescu: "Chemistry and Technology of Polyols for Polyurethanes"; Smithers Rapra Publishing, 2005, 2nd Edition, Volume 1, page 177-196 (chapter 5: "Synthesis of High-Molecular Weight Polyether Polyols with Double Metal Cyanide Catalysts).

The alcohol alkoxylates clearly show better miscibility pressure reduction when compared to the corresponding alcohols, as shown in Table 4 and 5 (comparative examples).

In order to demonstrate the improvement of this disclosure over the prior art CN104610953 A, where the addition of a solvent (C1-C5 alcohols) is mandatory and linear alkoxylated alcohols C10-18+0-12 EO+2-10 PO were described, the compounds of this invention are compared to CN104610953 A under identical conditions in Table 6.

From the presented data follows that the claimed alkoxylated alcohols outperform the fluids claimed in CN104610953 A.

The swelling behaviour was determined by visual observation. The sample was allowed to equilibrate in the pressure resistant sapphire view cell at constant pressure and temperature until the phases separated completely. The volume of the lower oil phase was subsequently recorded. The swelling factor SF was determined as the ratio of that volume to the initial volume of the oil phase at that temperature and ambient pressure ($SF=V_{oil}/V^0_{oil}$).

The swelling factors were recorded at 65° C. in the system aco38.0 and $CO_2$ containing 25 wt % aco38.0 with increasing pressure without the additives and in the presence of 2 wt % of C6P3 and ITDAE2, respectively.

TABLE 3

Swelling behaviour with the additives added to $CO_2$:

| Pure $CO^2$ | +2% ITDAE2 | +2% C6P3 |
|---|---|---|
| 32% | 38.5% | 39% |

It is clear that addition of the additives described in this invention, leads to increased swelling factors. The swelling factors displayed by the crude oil should increase at least by 4%. The swelling factors of the two examples described above increased between 6.5 and 7.0%—a highly beneficial improvement during $CO_2$ injection oil recovery processes.

TABLE 4

Miscibility pressure of displacing fluid and the different oils as well as pressure reduction compared to the systems without alcohol alkoxylates at different temperatures

| # | Oil | Compound | Alcohol-Moiety- | EO | PO | Temperature [° C.] | Additive Concentration in $CO_2$ [wt %] | Miscibility Pressure [psi] | Pressure Reduction [%] |
|---|---|---|---|---|---|---|---|---|---|
| 1 | mco47.0 | C4E1P3 | linear C4 (Butanol) | 1 | 3 | 65 | 2 | 4177 | 21.1% |
| 2 | mco47.0 | C4P7 | linear C4 (Butanol) |  | 7 | 75 | 2 | 4090 | 17.1% |
| 3 | mco47.0 | C8E6 | linear C8 (NACOL8) | 6 |  | 65 | 2 | 4279 | 19.2% |
| 4 | mco47.0 | iC8E2P7 | branched C8 (2-Ethylhexanol) | 2 | 7 | 65 | 1 | 4699 | 11.2% |
| 5 | mco47.0 | iC9P2 | branched C9 (Isonanol) |  | 2 | 65 | 2 | 4482 | 15.3% |
| 6 | mco47.0 | ISOFOL12E1 | branched C12 (ISOFOL 12) | 1 |  | 65 | 2 | 4134 | 21.9% |
| 7 | mco47.0 | ISOFOL12P4 | branched C12 (ISOFOL 12) |  | 4 | 65 | 1 | 4859 | 8.2% |
| 8 | mco47.0 | ISOFOL12P4 | branched C12 (ISOFOL 12) |  | 4 | 65 | 2 | 4119 | 22.2% |
| 9 | mco47.0 | ISOFOL16P4 | branched C16 (ISOFOL 16) |  | 4 | 65 | 2 | 4119 | 22.2% |
| 10 | mco47.0 | ITDAE2 | branched C13 (MARLIPAL O13) | 2 |  | 65 | 2 | 4293 | 18.9% |
| 11 | mco38.8 | C6P2 | linear C6 (NACOL 6) |  | 2 | 75 | 2 | 4757 | 16.3% |
| 12 | mco38.8 | C6P3 | linear C6 (NACOL 6) |  | 3 | 65 | 2 | 4598 | 23.2% |
| 13 | mco38.8 | C6P3 | linear C6 (NACOL 6) |  | 3 | 75 | 2 | 4525 | 20.4% |
| 14 | mco38.8 | ISOFOL12E1 | branched C12 (ISOFOL 12) | 1 |  | 75 | 2 | 4670 | 17.9% |
| 15 | mco38.8 | ITDAE4 | branched C13 (MARLIPAL O13) | 4 |  | 75 | 2 | 4743 | 16.6% |
| 16 | aco38.0 | C6P1 | linear C6 (NACOL 6) |  | 1 | 65 | 2 | 3814 | 27.9% |
| 17 | aco38.0 | C6P1 | linear C6 (NACOL 6) |  | 1 | 75 | 2 | 3669 | 30.3% |
| 18 | aco38.0 | C6P4 | linear C6 (NACOL 6) |  | 4 | 65 | 2 | 3974 | 24.9% |
| 19 | aco38.0 | ISOFOL12P1 | branched C12 (ISOFOL 12) |  | 1 | 75 | 2 | 4018 | 23.7% |
| 20 | aco38.0 | ISOFOL12P3 | branched C12 (ISOFOL 12) |  | 3 | 65 | 2 | 3873 | 26.8% |
| 21 | aco38.0 | ISOFOL12P4 | branched C12 (ISOFOL 12) |  | 4 | 75 | 2 | 4047 | 23.1% |

TABLE 5

| # | Oil | Compound | Alcohol-Moiety | EO | PO | Temp. [° C.] | Additive Concentration in $CO_2$ [wt %] | Miscibility Pressure [psi] | Pressure Reduction [%] |
|---|---|---|---|---|---|---|---|---|---|
| 1 | mco47.0 | C4E1P3 | linear C4 (Butanol) | 1 | 3 | 65 | 2 | 4177 | 21.1% |
| 22 | mco47.0 | Butanol |  |  |  | 65 | 2 | 4656 | 12.1% |
| 2 | mco47.0 | C4P7 | linear C4 (Butanol) |  | 7 | 75 | 2 | 4090 | 17.1% |
| 23 | mco47.0 | Butanol |  |  |  | 75 | 2 | 4619 | 6.3% |
| 16 | aco38.0 | C6P1 | linear C6 (NACOL 6) |  | 1 | 65 | 2 | 3814 | 27.9% |
| 24 | aco38.0 | linear C6 (NACOL6) |  |  |  | 65 | 2 | 4076 | 23.0% |
| 10 | mco47.0 | ISOFOL16P4 | branched C16 (ISOFOL 16) |  | 4 | 65 | 2 | 4119 | 22.2% |
| 25 | mco47.0 | branched C16 (ISOFOL 16)| |  |  |  | 65 | 2 | 4525 | 14.5% |
| 17 | aco38.0 | C6P1 | linear C6 (NACOL 6) |  | 1 | 75 | 2 | 3669 | 30.3% |
| 26 | aco38.0 | linear C6 (NACOL6) |  |  |  | 75 | 2 | 4177 | 20.7% |

TABLE 6

| # | Oil | Additive | Additive Concentration in $CO_2$ [wt %] | Co-solvent | Co-solvent Concentration in $CO_2$ [wt %] | $MMP_P$ [psi] | Pressure Reduction |
|---|---|---|---|---|---|---|---|
|  | mco47 |  |  |  |  | 5294 | 0.0% |
| 27 | mco47 | NACOL 12-2EO-7PO (linear C12 alkyl group; from CN104610953) | 0.6 | Butanol | 0.4 | 5163 | 2.5% |
| 28 | mco47 | ISOFOL 16-2EO-7PO (branched C16 alkyl group) | 0.6 | Butanol | 0.4 | 5033 | 4.9% |
| 29 | mco47 | 2-EH-2EO-7PO (branched C8 alkyl group) | 0.6 | Butanol | 0.4 | 4917 | 7.1% |
| 30 | mco47 | ITDA-3PO (branched C13 alkyl group) | 0.6 | Butanol | 0.4 | 4859 | 8.2% |
| 31 | mco47 | NACOL 8-2EO-7PO (linear C8 alkyl group) | 0.6 | Butanol | 0.4 | 4815 | 9.0% |

TABLE 6-continued

| # | Oil | Additive | Additive Concentration in CO$_2$ [wt %] | Co-solvent | Co-solvent Concentration in CO$_2$ [wt %] | MMP$_P$ [psi] | Pressure Reduction |
|---|---|---|---|---|---|---|---|
| 32 | mco47 | NACOL 6-3PO (linear C6 alkyl group) | 0.6 | Butanol | 0.4 | 4801 | 9.3% |

TABLE 7

| | | Compounds used: | | | |
|---|---|---|---|---|---|
| # | Compound | Alcohol-Moiety | EO | PO | |
| 1 | C4E1P3 | linear C4 (Butanol) | 1 | 3 | 1-butanol + 1EO + 3PO |
| 2 | C4P7 | linear C4 (Butanol) | | 7 | 1-butanol + 7EO |
| 3 | C8E6 | linear C8 (NACOL 8) | 6 | | 1-octanol + 6EO |
| 4 | iC8E2P7 | branched C8 (2-Ethylhexanol) | 2 | 7 | 2-ethylhextanol + 2EO + 7PO |
| 5 | iC9P2 | branched C9 (Isonanol) | | 2 | Isononanol + 2PO |
| 6 | ISOFOL12E1 | branched C12 (ISOFOL 12) | 1 | | 2-butyloctanol + 1EO |
| 7 | ISOFOL12P4 | branched C12 (ISOFOL 12) | | 4 | 2-butyloctanol + 4PO |
| 8 | ISOFOL12P4 | branched C12 (ISOFOL 12) | | 4 | 2-butyloctanol + 4PO |
| 9 | ISOFOL16P4 | branched C16 (ISOFOL 16) | | 4 | 2-hexyldecanol + 4PO |
| 10 | ITDAE2 | branched C13 (MARLIPAL O13) | 2 | | Isotridecylalcohol + 2EO |
| 11 | C6P2 | linear C6 (NACOL 6) | | 2 | 1-hexanol + 2PO |
| 12 | C6P3 | linear C6 (NACOL 6) | | 3 | 1-hexanol + 3PO |
| 13 | C6P3 | linear C6 (NACOL 6) | | 3 | 1-hexanol + 3PO |
| 14 | ISOFOL12E1 | branched C12 (ISOFOL 12) | 1 | | 2-butyloctanol + 1EO |
| 15 | ITDAE4 | branched C13 (MARLIPAL O13) | 4 | | Isotridecylalcohol + 4EO |
| 16 | C6P1 | linear C6 (NACOL 6) | | 1 | 1-hexanol + 1PO |
| 17 | C6P1 | linear C6 (NACOL 6) | | 1 | 1-hexanol + 1PO |
| 18 | C6P4 | linear C6 (NACOL 6) | | 4 | 1-hexanol + 4PO |
| 19 | ISOFOL12P1 | branched C12 (ISOFOL 12) | | 1 | 2-butyloctanol + 1PO |
| # | Compound | Alcohol/Alcohol-Moiety | EO | PO | |
| 20 | ISOFOL12P3 | branched C12 (ISOFOL 12) | | 3 | 2-butyloctanol + 3PO |
| 21 | ISOFOL12P4 | branched C12 (ISOFOL 12) | | 4 | 2-butyloctanol + 4PO |
| 22 | Butanol | linear C4 (Butanol) | | | 1-butanol |
| 23 | Butanol | linear C4 (Butanol) | | | 1-butanol |
| 24 | NACOL 6 | linear C6 (NACOL 6) | | | 1-hexanol |
| 25 | ISOFOL 16 | branched C16 (ISOFOL 16) | | | 2-hexyldecanol |
| 26 | NACOL 6 | linear C6 (NACOL 6) | | | 1-hexanol |
| 27 | NACOL 12-2EO-7PO | linear C12 (NACOL 12) | 2 | 7 | 1-dodecanol + 2EO + 7PO |
| 28 | ISOFOL 16-2EO-7PO | branched C16 (ISOFOL 16) | 2 | 7 | 2-hexyldecanol + 2EO + 7PO |
| 29 | 2-EH-2EO-7PO | branched C8 | 2 | 7 | 2-ethylhextanol + 2EO + 7PO |
| 30 | ITDA-3PO | branched C13 | | 3 | Isotridecylalcohol + 3PO |
| 31 | NACOL 8-2EO-7PO | linear C8 (NACOL 8) | 2 | 7 | 1-octanol + 2EO + 7PO |
| 32 | NACOL 6-3PO | linear C6 (NACOL 6) | | 3 | 1-hexanol + 3PO |

The invention claimed is:

1. A method for flooding of oil wells by carbon dioxide injection, the method comprising:
   i) providing an injection fluid comprising one or more alkoxylated alcohols having the following structure:

$$R\text{—}O\text{-}(AO)_{m+n}\text{—}H \quad (I)$$

wherein
   R is a linear alkyl group having from C4 to C8 carbon atoms, and/or a branched alkyl group having from C4 to C18 carbon atoms;
   AO is EO and/or PO, independent of each m or n;
   m is 0 to 12;
   n is 0 to 12; and
   m+n is at least 1;
   and at least liquid or supercritical carbon dioxide;

ii) injecting the injection fluid into a reservoir comprising a hydrocarbonaceous fluid, the reservoir being operated at a pressure below the minimum miscibility pressure, where the minimum miscibility pressure is the minimum pressure that has to be applied to the carbon dioxide injected for achieving a multiple contact miscible flood;

wherein
   (A) the miscibility pressure between the injection fluid and the hydrocarbonaceous fluid is lowered by 4.9% to 30.3% compared to the miscibility pressure between the hydrocarbonaceous fluid and carbon dioxide only, or
   (B) the swelling factor of the hydrocarbonaceous fluid is increased by the injection fluid compared to the swelling factor of the hydrocarbonaceous fluid including the carbon dioxide only, or (C) both (A) and (B);

iii) recovering the hydrocarbonaceous fluid from the reservoir.

2. The method of claim 1 wherein a) the injection fluid comprises less than 1 wt. % water; or b) wherein the injection fluid consists of the one or more alkoxylated alcohols and the liquid or supercritical carbon dioxide; or c) wherein the injection fluid consists of the one or more alkoxylated alcohols, the liquid or supercritical carbon dioxide and a linear C4 to C9 alcohol or a branched alcohol having 4 to 18 carbon atoms or both.

3. The method of claim 1, wherein the alkoxylated alcohols have the following structure $$R—O-(A'O)_m-(A''O)_n—H \quad (II)$$

wherein

R is a linear alkyl group having from C4 to C8 carbon atoms, and/or a branched alkyl group having from C4 to C18 carbon atoms;

m is 1 to 12;

n is 1 to 12;

A'O is an ethoxy group (EO) and A''O is a propoxy group (PO); or

A'O is a propoxy group (PO) and A''O is an ethoxy group (EO).

4. The method of claim 1, wherein m is 1 to 8; and n is 1 to 8.

5. The method of claim 1, wherein the swelling factor of the hydrocarbonaceous fluid is increased by the injection fluid by 4% to 7% compared to the swelling factor of the hydrocarbonaceous fluid including carbon dioxide only.

6. The method of claim 1, wherein R is a linear C4 to C8 alkyl group.

7. The method of claim 1, wherein R is a branched alkyl group having 4 to 18 carbon atoms.

8. The method of claim 1, wherein R is a branched alkyl group having 8 to 14 carbon atoms.

9. The method of claim 1, wherein AO is EO.

10. The method of claim 1, wherein AO is PO.

11. The method of claim 1, wherein m+n is from 1 to 8.

12. The method of claim 1, wherein m+n is from 1 to 6.

13. The method of claim 1, wherein the hydrocarbonaceous fluid is a crude oil and the reservoir is a well.

14. The method of claim 1, wherein the miscibility pressure between the injection fluid and the hydrocarbonaceous fluid is lowered compared to the miscibility pressure between the hydrocarbonaceous fluid and carbon dioxide only by 8.2% to 30.3%.

15. The method of claim 1, wherein the miscibility pressure between the injection fluid and the hydrocarbonaceous fluid is lowered compared to the miscibility pressure between the hydrocarbonaceous fluid and carbon dioxide only by 16.3% to 30.3%.

16. The method of claim 1, wherein the injection fluid does not comprise water.

17. A method comprising:

i) adding one or more alkoxylated alcohols having the following structure:

$$R—O-(AO)_{m+n}—H \quad (I)$$

wherein

R is a linear alkyl group having from C4 to C8 carbon atoms, and/or a branched alkyl group having from C4 to C18 carbon atoms;

AO is EO and/or PO, independent of each m or n;

m is 0 to 12;

n is 0 to 12; and m+n is at least 1 into an injection fluid comprising at least liquid or supercritical carbon dioxide, ii) injecting the injection fluid into a reservoir, the reservoir being operated at a pressure below the minimum miscibility pressure, where the minimum miscibility pressure is the minimum pressure that has to be applied to the carbon dioxide injected for achieving a multiple contact miscible flood; and wherein (A) the miscibility pressure between the injection fluid and the hydrocarbonaceous fluid is lowered by 4.9% to 30.3% compared to the miscibility pressure between the hydrocarbonaceous fluid and carbon dioxide only, or (B) the swelling factor of the hydrocarbonaceous fluid is increased by the injection fluid compared to the swelling factor of the hydrocarbonaceous fluid including the carbon dioxide only, or (C) both (A) and (B); and iii) recovering hydrocarbonaceous fluid from the reservoir.

18. A method comprising:

i) adding one or more alkoxylated alcohols having the following structure:

$$R—O-(AO)_{m+n}—H \quad (I)$$

wherein

R is a linear alkyl group having from C4 to C8 carbon atoms, and/or a branched alkyl group having from C4 to C18 carbon atoms;

AO is EO and/or PO, independent of each m or n;

m is 0 to 12;

n is 0 to 12; and m+n is at least 1 into an injection fluid comprising at least liquid or supercritical carbon dioxide, ii) injecting the injection fluid into a reservoir, the reservoir being operated at a pressure below the minimum miscibility pressure, where the minimum miscibility pressure is the minimum pressure that has to be applied to the carbon dioxide injected for achieving a multiple contact miscible flood; and wherein the miscibility pressure between the injection fluid and the hydrocarbonaceous fluid is lowered by 4.9% to 30.3% compared to the miscibility pressure between the hydrocarbonaceous fluid and carbon dioxide; and iii) recovering hydrocarbonaceous fluid from the reservoir.

* * * * *